C. HILDRETH & J. T. RABUS.
PLANT PROTECTOR.
APPLICATION FILED JULY 19, 1916.

1,207,039.

Patented Dec. 5, 1916.
2 SHEETS—SHEET 1.

Witnesses

Inventors,
Charles Hildreth,
John T. Rabus,
By Victor J. Evans
Attorney

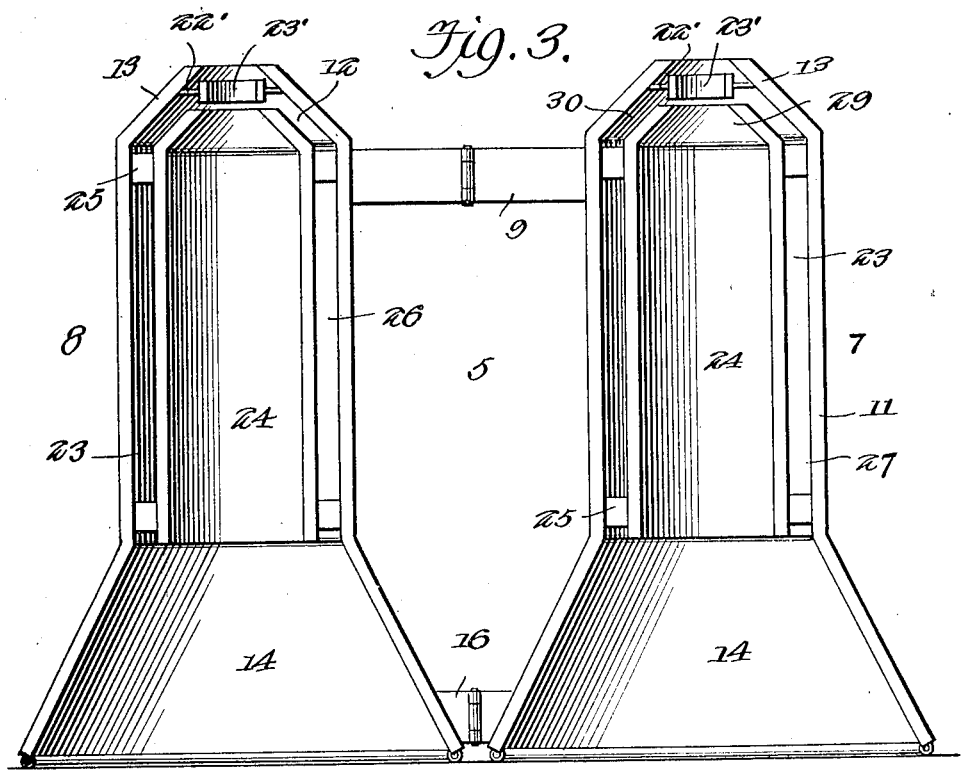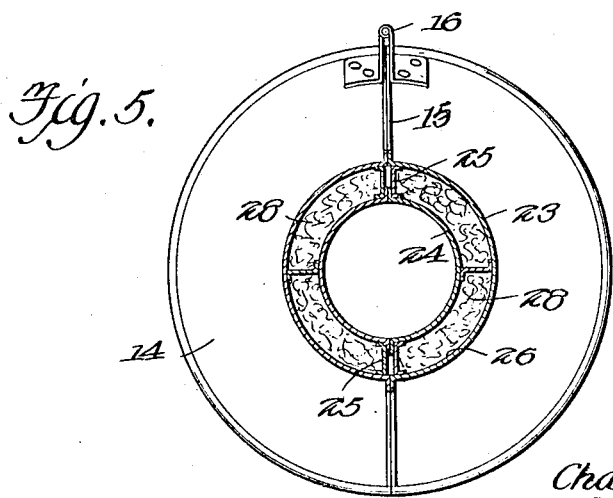

UNITED STATES PATENT OFFICE.

CHARLES HILDRETH AND JOHN T. RABUS, OF STAUNTON, ILLINOIS.

PLANT-PROTECTOR.

1,207,039.

Specification of Letters Patent.

Patented Dec. 5, 1916.

Application filed July 19, 1916. Serial No. 110,166.

*To all whom it may concern:*

Be it known that we, CHARLES HILDRETH and JOHN T. RABUS, citizens of the United States, residing at Staunton, in the county of Macoupin and State of Illinois, have invented new and useful Improvements in Plant-Protectors, of which the following is a specification.

The present invention aims in the provision of a plant protector so designed to snugly fit around plants, thus preventing their freezing during winter weather or any sudden changes in the temperature, and further serving to guard the plant against injury by insects, animals or the like.

Another object of the invention resides in the provision of a protector of the above stated character, which may be easily and readily assembled for use, shall be simple in construction, durable in use and manufactured and sold at a minimum cost.

A still further object of the invention is the provision of a flared base portion for the protector, thereby accommodating the same fitting over the soil around the roots of the plant.

With the above and other objects in view, the invention consists in the novel features, details of construction and combination of parts which will hereinafter be more fully set forth, illustrated in the accompanying drawing and pointed out in the appended claims.

Figure 1:
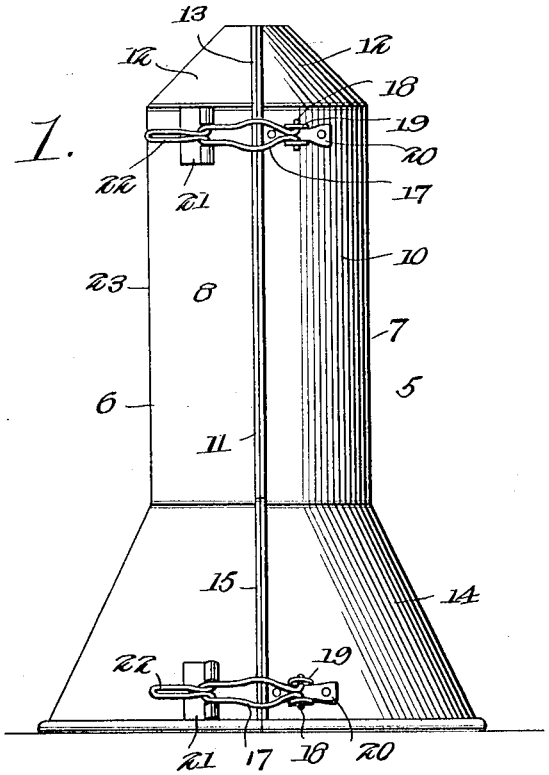
Figure 2:
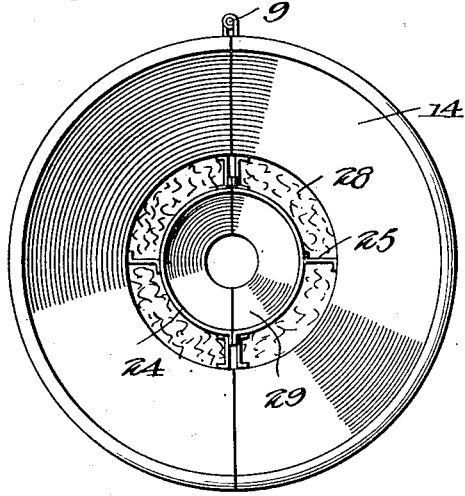
Figure 4:
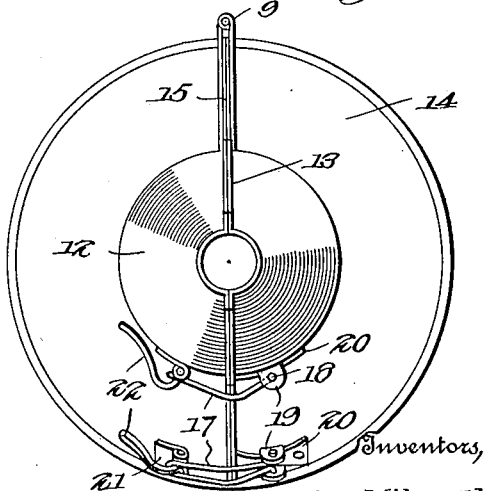

Figure 1 is a side elevation of the protector in closed position; Fig. 2 is a bottom plan view; Fig. 3 is a side elevation of the protector in full open position; Fig. 4 is a top plan view; and Fig. 5 is a transverse section taken through Fig. 1.

Referring more particularly to the accompanying drawings, in which like characters of reference refer to corresponding parts in the several views, 5 denotes the plant protector generally, which may be constructed of any desirable material, but preferably sheet metal, and so constructed to provide a cylindrical casing 6. This casing 6 comprises a pair of semi-cylindrical sections 7 and 8 hingedly connected together through the medium of hinges 9. The material forming the body portion 10 of each of said sections is bent flat along the opposite longitudinal edges thereof to provide abutting flanges 11, whereby upon the closing of the sections together, the longitudinal flanges 11 of one section will snugly engage with the longitudinal flanges of the opposite section and establish a seal-tight connection between both of said sections. Formed on the upper end of the body portion 10 of each of said sections is an inwardly inclined cap 12, said caps being provided with oppositely extending upwardly converging flanges 13, which, like the flanges 11, snugly engage with one another upon the locking or closing of the sections around the plant. In order to protect the roots of the plant, and in order that the protector may accommodate the earth or soil usually placed around such roots, we provide each of the sections with a downwardly and outwardly broadened flared base 14 of substantially semi-circular form in cross section. The downwardly and outwardly flared base portions 14 of each of the sections, when in closed position, provides the same with a substantially frusto-conical formed base, whereby the enlarged end thereof will contact with the ground surface, thus preventing any tilting or upsetting action of the protector when in applied position. The material from which these sections are formed is bent along the confronting edges of the sections in a lateral direction to provide side flanges 15, the purpose of which is also to afford a tight connection between the meeting faces of the sections when the same are in closed position. These sections are also hingedly connected by a short hinge 16 provided on the exterior surface of the body portion 10 of each of the sections adjacent the upper end thereof, and also on the flared base sections 14, are means for locking the casing and the base section in closed position, said means comprising a pivoted U-shaped hasp 17 constructed from a single strand of wire, and terminally bent to form angular trunnions 18 which are inserted in the apertured ears 19 of the bearing plate 20, mounting the hasps on one of the sections of the casing and one of the sections of the plate for horizontal swinging movement. A resilient lever 22 is pivotally mounted between the bearing plates 21. This lever 22 is adapted to engage in the loop of the U-shaped hasps 18, and by throwing the lever upon the section to which the same is pivotally mounted, will draw the hasp taut over the free vertical edges of the longitudinal edges formed on the free vertical edges of the sections, thus securely locking the sections in a closed position and excluding the entrance of air therebetween. The same operation is applied to the fastening of the base sections together and adapted for the same purpose as that described for the fastening of the casing sections together.

Each of the semi-cylindrical sections 7 and 8 forming the casing 6, is provided with an outer wall 23 and an inner wall 24, the inner wall 24 of each of the sections being disposed in spaced parallel relation to the outer wall 23 through the medium of the diametrically opposed spacing members 25, forming between the sections a space 26. Inserted within the space 26 and between the body portion 27 of the inner wall 24, is a packing 28, preferably consisting of a sheet of asbestos, or any other suitable material, thus serving as a protector for excluding the entrance of air to the plants during severe cold weather, and sudden changes in the temperature. The body portion 27 of the inner wall is further provided with a contracted frusto-conical top 29, disposed in spaced relation to the cap 12, and in which is also inserted layers of packing material 30, which like the packing 28, is preferably asbestos.

From the foregoing description, taken in connection with the accompanying drawing, the advantages of construction and of the method of operation will be readily apparent to those skilled in the art to which the invention relates, and while we have described the principles of operation of the invention, together with the device which we now consider to be the best embodiment thereof, we desire to have it understood that the device shown is merely illustrative, and that such changes may be made when desired as are within the scope of the claims appended thereto.

We claim:

1. A plant protector comprising a hollow tubular cylinder, said cylinder comprising a pair of hingedly connected sections, each provided along their vertical edges with laterally extending flanges, a cap for each of said sections, and means pivotally mounted on each of said sections for interlocking engagement with one another, for holding the flanges of one section in contact with the flanges of the opposite section, substantially as and for the purpose specified.

2. A plant protector embodying a cylindrical casing including a pair of semi-cylindrical hingedly connected sections, each of said sections having outer and inner walls, means for spacing the walls from one another, each of the said inner and outer walls of the section being provided with a contracted upper end, and a flared base formed contiguous with and on the lower end of the outer wall of said sections, and means for locking the sections together.

3. A device of the class described embodying a casing formed from a pair of hingedly connected sections, each of said sections being provided with inner and outer spaced side and top walls, a packing interposed between the side and top walls of said section, and means for locking said sections in abutting relation one to the other.

In testimony whereof we affix our signatures.

CHARLES HILDRETH.
JOHN T. RABUS.

Copies of this patent may be obtained for five cents each, by addressing the "Commissioner of Patents, Washington, D. C."